(12) United States Patent
Streetman

(10) Patent No.: US 10,548,267 B2
(45) Date of Patent: Feb. 4, 2020

(54) VACUUM DEBRIS COLLECTION APPARATUS

(71) Applicant: Randy Streetman, Gunter, TX (US)

(72) Inventor: Randy Streetman, Gunter, TX (US)

( * ) Notice: Subject to any disclaimer, the term of this patent is extended or adjusted under 35 U.S.C. 154(b) by 375 days.

(21) Appl. No.: 15/231,270

(22) Filed: Aug. 8, 2016

(65) Prior Publication Data

US 2018/0035615 A1     Feb. 8, 2018

(51) Int. Cl.
| | | |
|---|---|---|
| *A01G 20/43* | (2018.01) |
| *A47L 5/36* | (2006.01) |
| *A47L 9/24* | (2006.01) |
| *A47L 9/32* | (2006.01) |
| *E01H 1/08* | (2006.01) |

(52) U.S. Cl.
CPC .............. *A01G 20/43* (2018.02); *A47L 5/365* (2013.01); *A47L 9/244* (2013.01); *A47L 9/327* (2013.01); *E01H 1/0836* (2013.01); *E01H 2001/0881* (2013.01)

(58) Field of Classification Search
CPC .................. A01G 20/43; E01H 1/0836; E01H 2001/0881; A47L 9/327; A47L 9/244; A47L 5/365; A47L 9/2884; A47L 9/1666
USPC ......................................................... 15/327.5
See application file for complete search history.

(56) References Cited

U.S. PATENT DOCUMENTS 5,588,177 A *  12/1996  Eriksen ..................... A47L 5/36
                                                          15/327.5
6,553,610 B1 *  4/2003  Shideler .................... A47L 5/36
                                                          15/327.5

\* cited by examiner

*Primary Examiner* — David Redding
(74) *Attorney, Agent, or Firm* — Merchant & Gould P.C.

(57) ABSTRACT

A debris collection system utilizing a vacuum to collect debris in a container. The system includes a bottom-mounted motor and an airflow pathway containing the vacuum generated by the motor for collecting the debris. A portion of the airflow pathway passes through a top into the container for depositing the debris and another portion of the airflow pathway after depositing the debris then passes to the exterior of the container to the motor.

15 Claims, 7 Drawing Sheets

VACUUM DEBRIS COLLECTION APPARATUS

FIELD OF THE INVENTION

This invention generally relates to debris collection and, more particularly, to outdoor portable debris collection along roadways, sidewalks and parks.

BACKGROUND

Attaching vacuums to vehicles is known. However, these known portable vacuums are typically used by park authorities or commercial companies because of their size and expense. Also, these vehicles are difficult to use because of their size and are designed to allow a rider to travel long distances in order to pick up occasional pieces of debris. Moreover, the vacuums included with these vehicles are limited by the size of the debris that may be encountered. For example, bottles and containers that are at least partially filled with liquid are difficult to pick up with these known vacuums and then often become lodged within the hose of the vacuum. Also, these known vacuums typically cannot easily deposit heavy items such as a filled bottle or container into a collection container without substantially obstructing the airflow to the motor that is creating the suction. What is needed is a new portable debris collection system with a vacuum that has an airflow path configured to prevent obstructions by bottles and containers and that maintains sufficient airflow until the debris is deposited into the container.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

According to one embodiment disclosed herein, a debris collection system utilizing a vacuum for collecting debris is provided. The debris collection system includes a container having sidewalls and a bottom to define an interior space for receiving and retaining the collected debris. A motor generates the vacuum or airflow and is detachably mounted by its housing to the bottom of the container. An airflow pathway is defined for the airflow generated by the motor. A portion of the airflow pathway passes through a top to the container to deposit the debris into the interior space of the container and another portion of the airflow pathway then passes from the top, to the exterior of the container, and to the motor to exhaust the airflow.

According to another embodiment disclosed herein, a method of collecting debris using a vacuum is provided. The method includes generating airflow from beneath a container for collecting debris. The method also provides an airflow pathway having a portion of the airflow pathway extending into the container and another portion of the airflow pathway extending outside of the container to a motor that generates the vacuum. The method then includes receiving debris into the airflow pathway utilizing the airflow and depositing the debris into the container from the portion of the airflow pathway extending into the container. The method also includes, after depositing the debris, continuing the airflow through the other portion of the airflow pathway extending outside of the container without the debris. The method may also include diverting the debris in the airflow pathway into the container without interrupting the airflow in the airflow pathway.

According to yet another embodiment disclosed herein, a mobile debris collector is provided. The mobile debris collector includes a container having sidewalls and a bottom which define an interior space for receiving and retaining collected debris. The mobile debris collector also includes a motor detachably mounted to the bottom of the container for generating airflow and an airflow pathway for collecting the debris via the airflow and to direct the debris into the interior space of the container. After directing the debris into the container, a portion of the airflow pathway extends from the container, along the exterior of the container, to the motor to exhaust the airflow from the airflow pathway.

One or more embodiments may include shoulder straps for wearing the debris collection system when collecting debris, wheels for pulling the debris collection system when collecting debris, and/or a battery for powering the motor.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration.

DESCRIPTION OF EXAMPLE EMBODIMENTS

Example embodiments of the present invention are disclosed. The various embodiments are meant to be nonlimiting examples of various ways of implementing the invention and it will be understood that the invention may be embodied in alternative forms. The present invention will be described more fully hereinafter with reference to the accompanying drawings in which like numerals represent like elements throughout the several figures and in which exemplary embodiments are shown. The figures are not necessarily to scale and some features may be exaggerated or minimized to show details of particular elements while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention.

Figure 1:
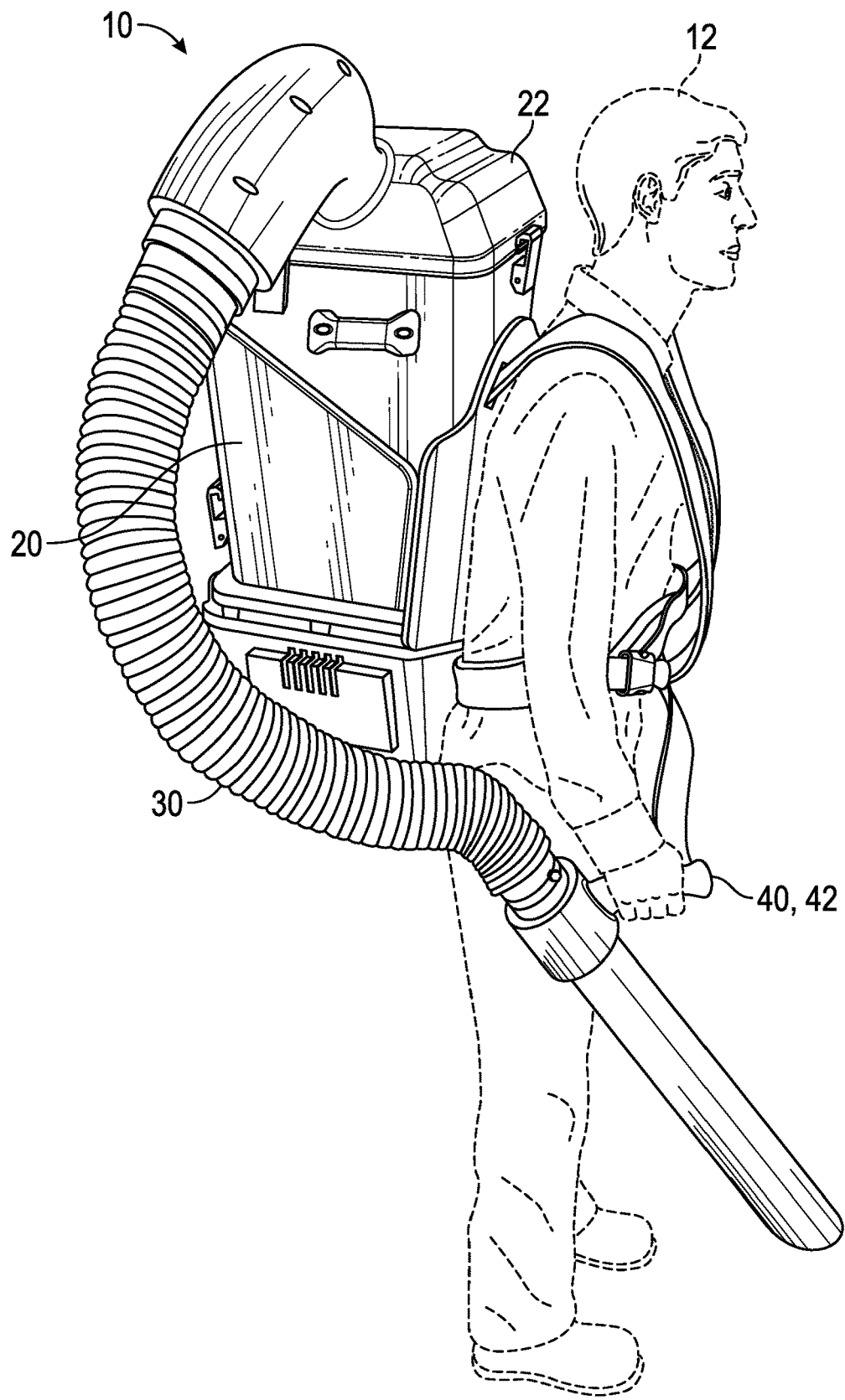
FIG. 1 illustrates a portable debris collection system with shoulder straps according to at least one embodiment disclosed herein.
Figure 2:
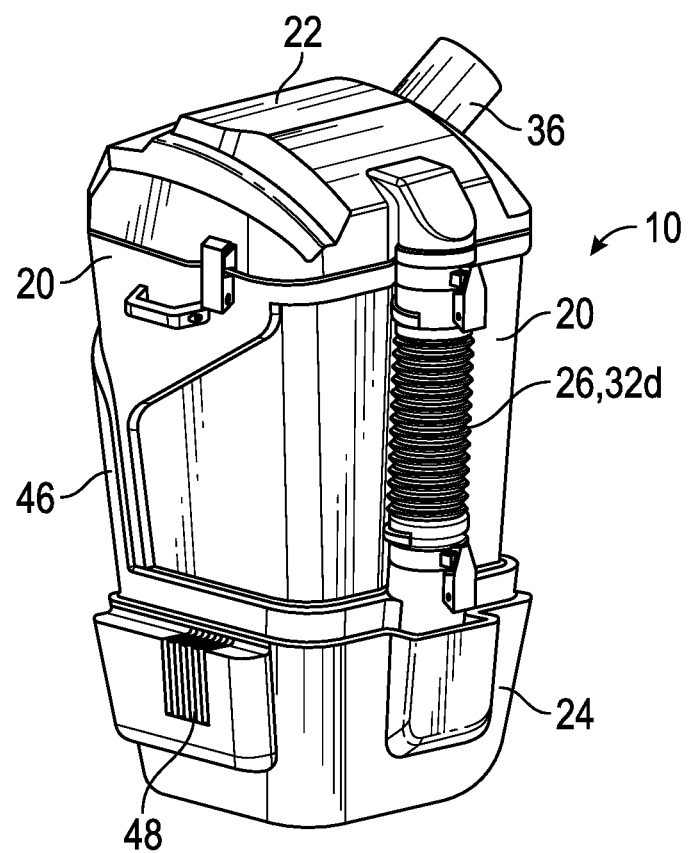
FIG. 2 illustrates a perspective view of the portable debris collection system of FIG. 1 without a hose according to at least one embodiment disclosed herein.
Figure 8:
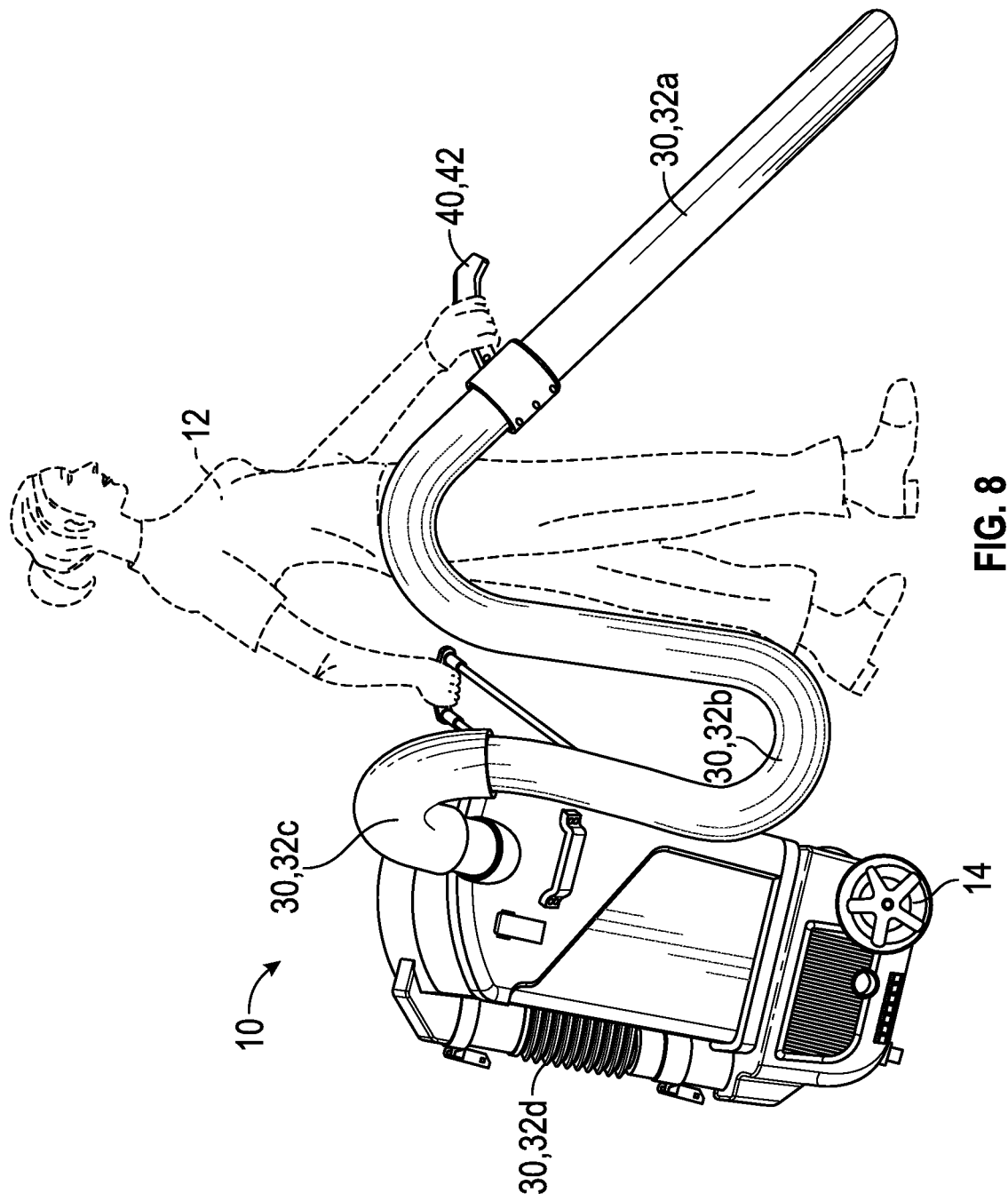
FIG. 8 illustrates an alternative embodiment of a portable debris collection system according to at least one embodiment disclosed herein.

The various embodiments of the present invention may be included in any type of debris collection system or apparatus. FIGS. 1-4 illustrate a debris collection system 10 according to one or more embodiments. FIG. 1 best illustrates the debris collection system 10 carried or worn by a user 12 (in phantom). However, the debris collection system 10 when having wheels 14 could instead be pulled (FIG. 8). The debris collection system 10 includes a container 20 having sidewalls, a bottom, and a top 22. The sidewalls and bottom define an interior space for receiving and retaining collected debris within the container 20.

A motor 24 is detachable coupled to the bottom of the container 20. The motor 24 is preferably gas or battery powered. Preferably, the motor 24 is of sufficient horsepower to generate the necessary airflow to pick up a liquid filled bottle through the hose. The motor 24 generates an airflow sometimes referred to as a vacuum. The vacuum preferably is sufficient to suck a bottle or container, at least partially filled with liquid, from the ground and into a hose 30 coupled to the container 20. Preferably, the bottom of the container 20 and a housing of the motor 24 are configured to be mechanically secured together and are keyed to fit one another. The bottom of the container 20 and the housing of the motor 24 may be detachably coupled together with mechanical fasteners such as latches.

Figure 3:
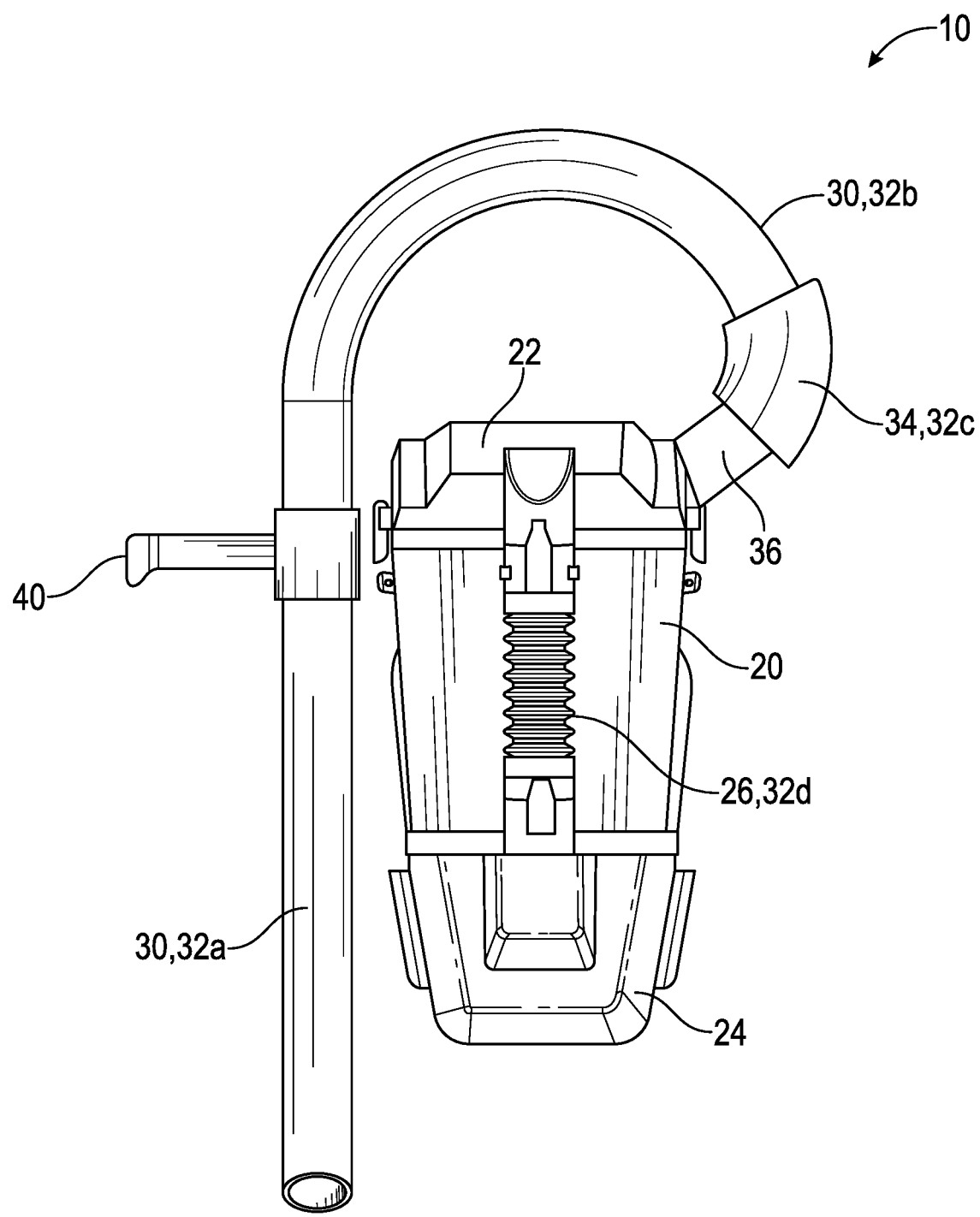
FIG. 3 illustrates a back view of the portable debris collection system of FIG. 1 according to at least one embodiment disclosed herein.
Figure 4:
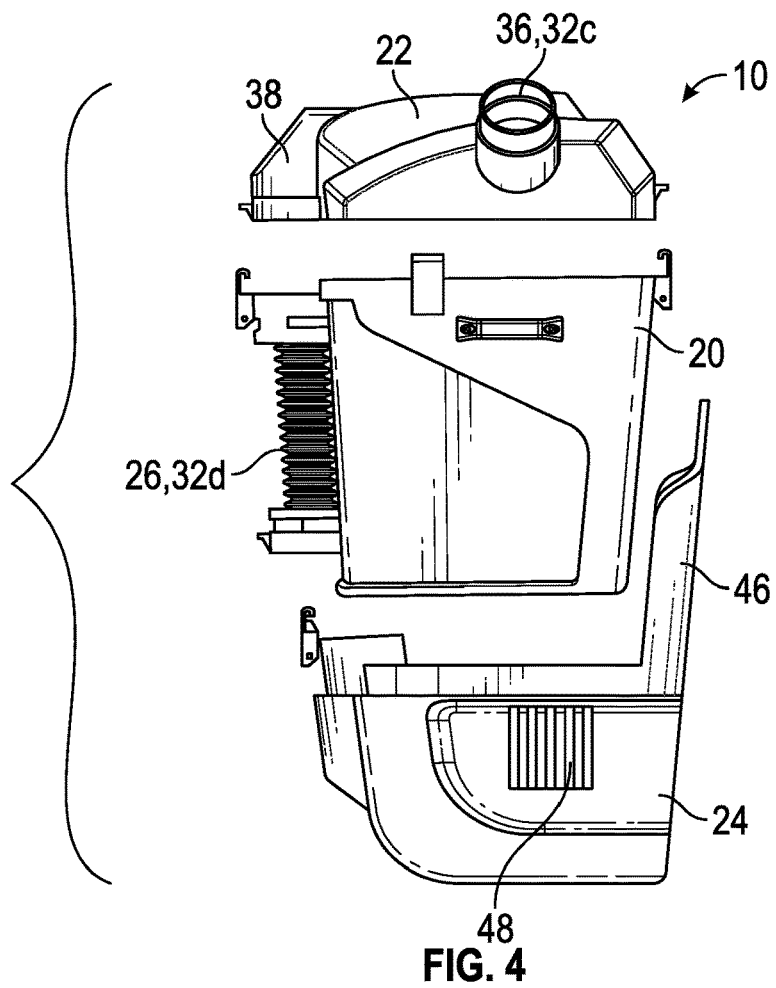
FIG. 4 illustrates an exploded side view of the portable debris collection system of FIG. 1 according to at least one embodiment disclosed herein.
Figure 5:
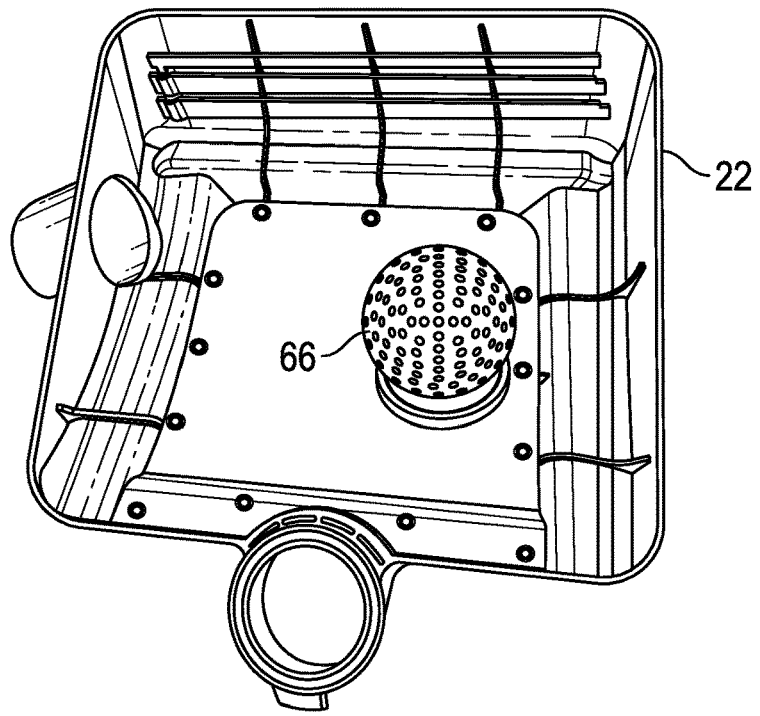
FIG. 5 illustrates an inside bottom view of a top to the container of the portable debris collection system of FIG. 1 according to at least one embodiment disclosed herein.
Figure 6:
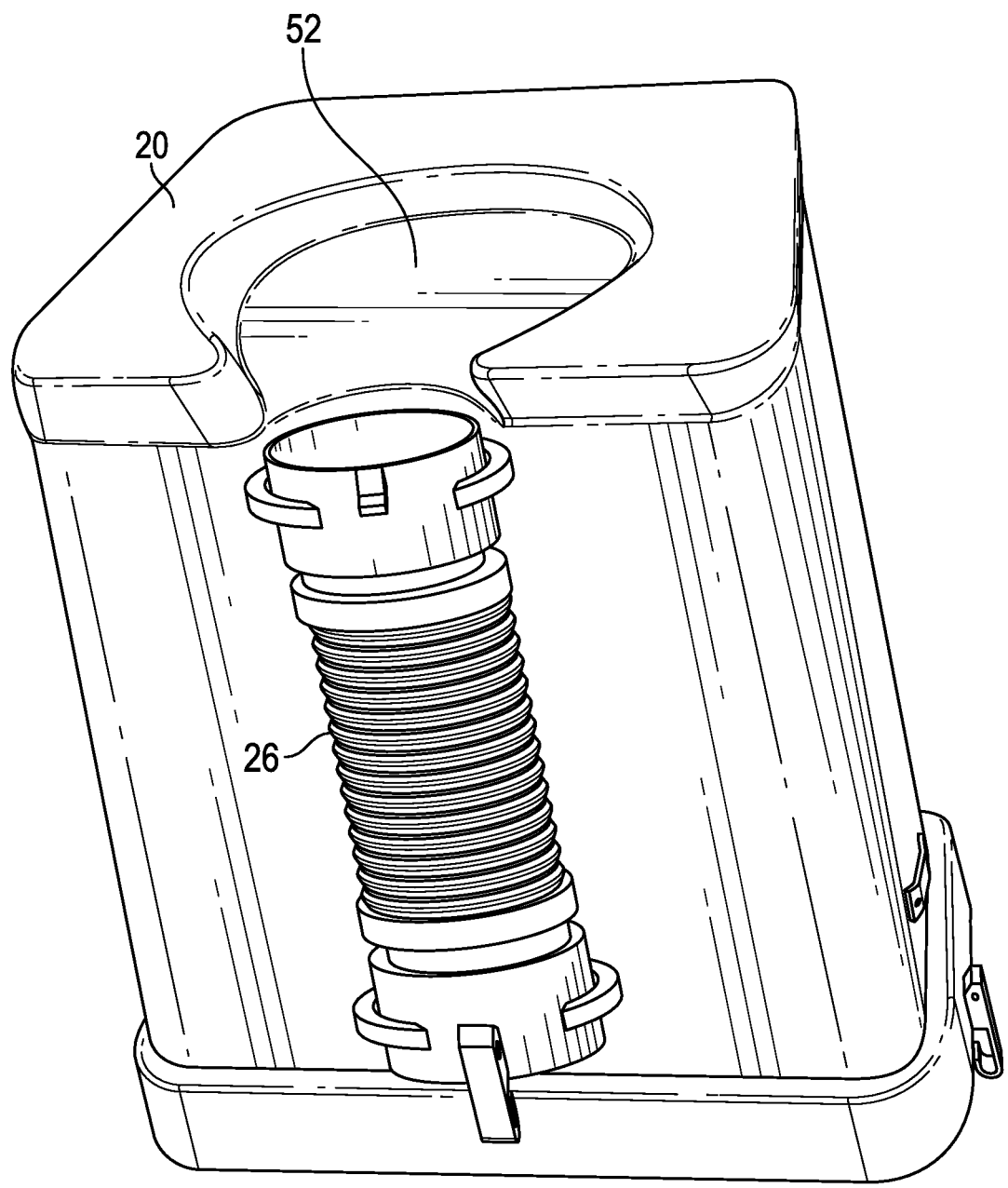
FIG. 6 illustrates a bottom perspective view of the container of the portable debris collection system of FIG. 1 according to at least one embodiment disclosed herein.

The debris collection system 10 also includes an airflow pathway 32a-32d, which hereinafter may be referred to collectively and/or generically as airflow pathway 32. The hose 30 corresponds with at least a portion of the airflow pathway 32. As best shown in FIG. 3, airflow pathway 32a corresponds with a portion of the hose 30 that is rigid and airflow pathway 32b corresponds with a portion of the hose 30 that is flexible. Preferably, the rigid portion of the hose 30 is adjustable in length so that users, who are different heights, may resize the length of the hose 30 to easily reach the ground. In one or more embodiments, the distal end of the hose 30 is telescopic. The distal end of the hose 30 is open and has an inner diameter sized to permit receipt of debris including bottles and other containers. Airflow pathway 32c corresponds with a portion of the hose 30 sometimes referred to as an elbow 34 which is used to couple the hose 30 to the top 22 of the container 20. As best shown in FIGS. 4 and 5, the top 22 includes an inlet 36 and an outlet 38. The elbow 34 is preferably used to couple the hose 30 to the inlet 36 of the top 22 of the container 20. Also, the elbow 34 is preferably configured so that the airflow pathway 32c is sized to permit a bottle or container to pass from the hose 30, through the inlet 36 and the top 22, and into the container 20.

The airflow pathway 32 also includes a portion 26 which is preferably tubular. However, the portion 26 may be shaped differently so long as the airflow from the hose 30 to the motor 32 is not significantly restricted by the portion 26 because any collected debris is not intended to pass through the portion 26. The portion 26 preferably has a length extending along the exterior of the container 20 between the top and bottom of the container 20. The outlet 38 of the top 22 is detachably coupled to the top end of the portion 26 when the top 22 is secured to the container 20 and the bottom end of the portion 26 is detachably coupled to an inlet in the housing of the motor 24 when the container 20 is secured to the housing of the motor 24. Therefore, portion 26 corresponds with portion 32d to have continuous airflow along the airflow pathway 32.

In one or more embodiments, a handle 40 is coupled to the hose 30 to allow the user to orient the distal end of the hose 30. Preferably, the handle 40 and the rigid portion of the hose 30 are integral to one another. The handle 40 may also include a controller 42 for controlling operation of the motor 24 to generate the airflow along the airflow pathway 32. Alternatively, the controller 42 may be coupled to the motor 24 in such a way that the controller 42 may be held in one hand and the handle 40 may be held in the other hand.

The motor 22 is configured to be mounted underneath or substantially below the container 20. However, a portion of the housing of the motor 22 may extend upward along one of the sidewalls of the container 20. In one or more embodiments, one side of a vertically extending portion 46 conforms to one of the sidewalls of the container 20 and an opposite side of the vertically extending portion 46 is configured to be positioned along the back of a user of the debris collection system 10. The vertically extending portion 46 also assists is aligning the container 20 with the motor 24 prior to coupling the container 20 with the motor 24. The housing of the motor 24 may also include an exhaust vent 48 for exhausting the airflow from the airflow pathway 32.

Figure 7:
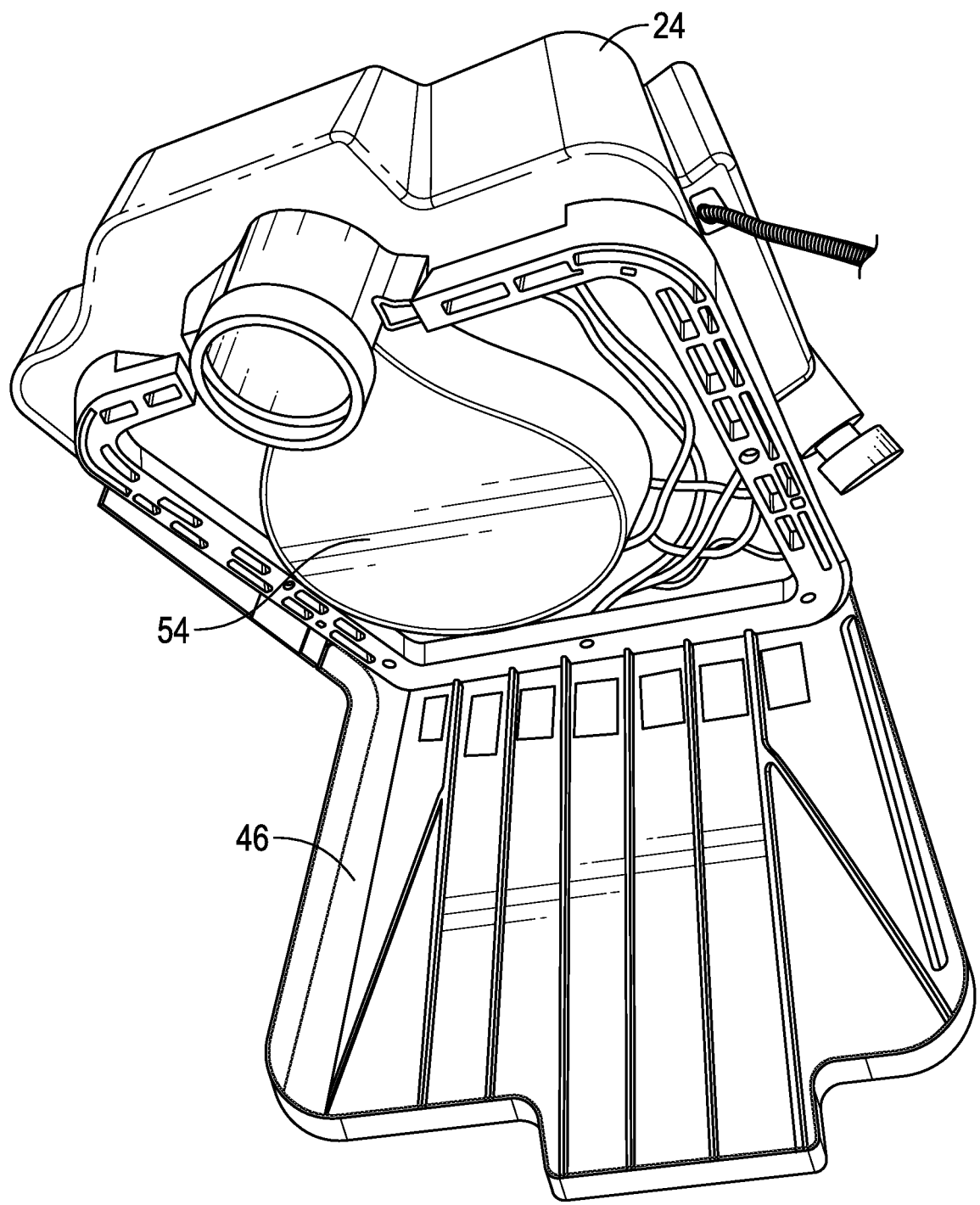
FIG. 7 illustrates a top perspective view of the housing of a motor of the container of the portable debris collection system of FIG. 1 according to at least one embodiment disclosed herein.

The combination of the bottom of the container 20 and the top of the housing of the motor 24 cooperate with one another in order to couple the container 20 and the motor 24 together. As best shown in FIGS. 7 and 8, the bottom of the container 20 includes a recessed portion 52 sized to receive a raised portion 54 of the housing of the motor 24. Thus, with the recessed portion 52 and the raised portion 54 the container 20 and the motor 24 may be keyed to one another and, therefore, properly aligned with one another when being coupled together so that the inlet 36 on the top 22 is oriented over one of the user's shoulders, for example the user's right shoulder, so that the handle 40 of the hose 30 may be held with the right hand. Also, keying the container 20 and the motor 24 to one another allows the portion 26 of the airflow pathway to be positioned on the back of the container 20 while the debris collection system 10 is being worn.

In one or more embodiments, the motor 24 is attached to a fan with blades that are angled. When the motor 24 turns the fan, air is forced toward the exhaust vent 48 which generates a pressure drop behind the fan. This creates the vacuum inside the length of the airflow pathway 32 toward the motor 24 and the exhaust vent 48. Ambient air is pulled into the distal end of the hose 30 as long as the motor 24 is running.

Debris collected in the hose 30 and passing along the airflow path 32 is received into the container 20 through the inlet 36 of the top 22. Because of the larger volume of the interior space of the container 20 compared to the portion of the airflow pathway between the inlet 36 and outlet 38 of the top 22 of the container, the debris falls into the container 20 and is retained in the container 20 while the airflow then continues through the confines of the outlet 38 of the top 22, through the portion 26 of the airflow pathway 32, toward the fan of the motor 24. The container may also include a filter 66 which preferably is coupled to the inside of top 22. The filter 66 hangs inside the container for filtering the airflow. The filter 66 prevents small or harmful pieces of debris from entering the motor/engine. The filter 66 also directs debris in a circular motion to create a more forceful airflow and suction.

Preferably, the debris passing along the airflow pathway 32 is received through the inlet 36 of the top 22 and into the container 20 in one direction and then the airflow pathway 32 out the outlet 38 of the top 22 of the container 20 is redirected in another direction within the top 22 of the container 20. In other words, the debris exits the airflow pathway 32 and is deposited into the container 20 between the inlet 36 and the outlet 38 of the top 22 of the container 20. In one or more embodiments, a length of travel the debris takes from the distal end of the hose 30 to the top 22 of the container 20 is shorter than a length of the airflow pathway 32 from the distal end of the hose 30 to the exhaust vent 48 in the housing of the motor 24.

In one or more embodiments, a mobile debris collector such as the debris collection system 10 may include shoulder straps for wearing the debris collection system 10 when collecting debris. Also, the mobile debris collector may include a battery for a battery powered motor.

The present invention, in addition to the debris collection system 10, also includes a method for collecting debris. The method includes generating airflow from beneath the container 20 for collecting debris and providing an airflow pathway 32 having a portion of the airflow pathway 32 extending into the container 20 and another portion of the airflow pathway 32 extending outside of the container 20 to the motor 24 generating the vacuum. The method then includes receiving debris into the airflow pathway 32 utilizing the airflow and depositing the debris into the container 20 from the portion of the airflow pathway 32 extending into the container 20. Next, after depositing the debris into the container 20, the method includes continuing the airflow through the other portion of the airflow pathway 32 extending outside of the container 20 without the debris.

The method may also include diverting the debris in the airflow pathway 32 into the container 20 without interrupting the airflow in the airflow pathway 32. One or more embodiments the step of generating the airflow from beneath the container 20 for collecting debris includes generating sufficient airflow to receive a bottle, partially or completely liquid filled, into the airflow pathway 32 and into the container 20. The method may also include receiving a liquid filled bottle into the airflow pathway 32 and into the container 20 as a result of the airflow generated by the motor 24. In addition, the method may include exhausting the airflow from the airflow pathway 32 through the housing of the motor 24 to an exterior environment.

In one or more embodiments, the method may include wearing the container 20 and the motor 24 coupled to the bottom of the container 20 and orienting a hose 30 housing the airflow pathway 32 in order to receive the debris into the hose 30.

It is important to note that the construction and arrangement of the elements of the debris collection system or apparatus as shown in the preferred and other exemplary embodiments is illustrative only. Although only a few embodiments of the present inventions have been described in detail in this disclosure, those skilled in the art who review this disclosure will readily appreciate that many modifications are possible (e.g. variations in combinations and sub- combinations of the amounts of the alloy elements) without materially departing from the novel teachings and advantages of the subject matter recited in the claims. For example, elements may be substituted and added, and the amounts of the elements may vary. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present inventions as expressed in the appended claims.

What is claimed is:

1. A debris collection system, comprising:
    a container having sidewalls and a bottom which define an interior space for receiving and retaining collected debris;
    a motor having a housing detachably mounted to the bottom of the container for generating a vacuum; and
    an airflow pathway containing the vacuum generated by the motor for collecting the debris, wherein a portion of the airflow pathway passes through a top to the container to deposit the debris into the space of the container and another portion of the airflow pathway then passes from the top to the exterior of the container and to the motor.

2. The debris collection system of claim 1, further comprising a hose corresponding with a portion of the airflow pathway, the hose coupled at one end to the top of the container and being open at a distal end.

3. The debris collection system of claim 2, wherein a portion of the hose is flexible and another portion at the distal end is rigid, and wherein the distal end includes an inner diameter sized to permit receipt of debris therein.

4. The debris collection system of claim 3, further comprising an elbow coupled between the hose and the top of the container so that the portion of the airflow pathway is sized to permit the bottle to pass from the hose, though the top, and into the container.

5. The debris collection system of claim 3, wherein a length of the rigid portion of the hose is adjustable.

6. The debris collection system of claim 1, further comprising a handle coupled to the hose and a controller for controlling operation of the motor.

7. The debris collection system of claim 1, wherein the housing of the motor comprises a vertically extending portion which corresponds with one of the sidewalls of the container when the housing of the motor is mounted to container.

8. The debris collection system of claim 1, wherein the portion of the airflow pathway passing from the top to the exterior of the container and to the motor is detachably coupled to the top of the container and to the housing of the motor such that the top and the motor may be detached from the container.

9. The debris collection system of claim 1, wherein debris passing along the airflow pathway is received in one direction into the top of the container and then the airflow pathway out the top of the container is redirected in another direction within the top of the container.

10. The debris collection system of claim 2, wherein a length of travel the debris takes from the distal end of the hose to the top of the container is shorter than a length of the airflow pathway from the distal end of the hose to the housing of the motor.

11. A mobile debris collector, comprising:
a container having sidewalls and a bottom which define an interior space for receiving and retaining collected debris;
a motor detachably mounted to the bottom of the container for generating airflow; and
an airflow pathway for collecting the debris via the airflow and directing the debris into the interior space of the container, wherein after directing the debris into the container, a portion of the airflow pathway extends from the container to the exterior of the container and to the motor to exhaust the airflow from the airflow pathway, wherein the portion of the airflow pathway extending to the exterior of the container and to the motor is detachably coupled to a cover of the container and to the motor.

12. The mobile debris collector of claim 11, further comprising shoulder straps for wearing the debris collector when collecting debris.

13. The mobile debris collector of claim 11, further comprising wheels coupled to the debris collector for pulling the debris collector when collecting debris.

14. The mobile debris collector of claim 11, wherein the motor is battery powered.

15. The mobile debris collector of claim 11, further comprising a cover detachably coupled to the container, the cover including an input and an output of the airflow pathway, wherein the debris is deposited into the container from the airflow pathway between the input and the output of the airflow pathway.

* * * * *